United States Patent
Kotajima et al.

(10) Patent No.: US 8,226,285 B2
(45) Date of Patent: Jul. 24, 2012

(54) VEHICLE HEADLAMP APPARATUS

(75) Inventors: Takuya Kotajima, Shizuoka (JP); Satoshi Yamamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 263 days.

(21) Appl. No.: 12/402,609

(22) Filed: Mar. 12, 2009

(65) Prior Publication Data
US 2009/0231873 A1 Sep. 17, 2009

(30) Foreign Application Priority Data

Mar. 14, 2008 (JP) ................. 2008-065218

(51) Int. Cl.
*B60Q 3/04* (2006.01)

(52) U.S. Cl. ........................ 362/543; 362/545

(58) Field of Classification Search .......... 362/543–545
See application file for complete search history.

(56) References Cited

U.S. PATENT DOCUMENTS

| 2006/0120094 A1* | 6/2006 | Tsukamoto et al. | 362/518 |
| 2007/0201241 A1* | 8/2007 | Komatsu | 362/545 |

FOREIGN PATENT DOCUMENTS

| DE | 43 13 914 A1 | 11/1994 |
| DE | 10 2006 023 163 A1 | 11/2006 |
| DE | 10 2007 002 689 A1 | 9/2007 |
| JP | 4-81337 A | 3/1992 |
| JP | 2004-231178 A | 8/2004 |
| JP | 2006-188224 A | 7/2006 |
| WO | 2006/016327 A2 | 2/2006 |

OTHER PUBLICATIONS

Extended European Search Report dated Feb. 23, 2011, in Application No. 09003685.6.

* cited by examiner

*Primary Examiner* — Julie Shallenberger

(74) *Attorney, Agent, or Firm* — Sughrue Mion, PLLC

(57) ABSTRACT

A vehicle headlamp apparatus is provided. The vehicle headlamp apparatus includes a low beam lamp unit which forms a low beam distribution pattern having a cutoff line along an upper edge thereof, and an additional lamp unit which forms an additional light distribution pattern including an area above the cutoff line of the low beam distribution pattern. The additional lamp unit is configured such that a luminous intensity of at least a portion of the additional light distribution pattern increases toward a horizontal line from above.

14 Claims, 7 Drawing Sheets

VEHICLE HEADLAMP APPARATUS

CROSS-REFERENCE TO RELATED APPLICATION

The present application claims priority from Japanese Patent Application No. 2008-065218 filed on Mar. 14, 2008, the entire content of which is incorporated herein by reference.

FIELD OF INVENTION

Apparatuses consistent with the present invention relate to vehicle headlamps.

DESCRIPTION OF RELATED ART

When vehicles are driven at nighttime, headlamps are normally turned on in a so-called "low beam" mode so as to illuminate surfaces of roads, and if necessary, the headlamps are turned on in a so-called "high beam" mode so as to better view regions in front of the vehicles. However, if light emitted from the headlamps is irradiated to an upper area which is located higher than a so-called "cutoff line", then there are some risks that glare may be generated for drivers of preceding vehicles (i.e., vehicles traveling in front of the vehicle and in the same direction as the vehicle) and also pedestrians who are present in areas in front of the vehicles. As a consequence, vehicle headlamps have been proposed by which, for example, positions of persons in front of the vehicle are determined, and then, masks having dimensions and positions corresponding to the determined persons are formed on image forming devices so as to form shadows projected around the persons (see, e.g., JP 2004-231178 A).

Also, for example, vehicle headlamp apparatuses have been proposed by which, for example, a detection is made whether or not a preceding vehicle is present, light of the vehicle headlamps is controlled in response to a detection result such that the light directed to one direction is reduced; and accordingly, the reduced light is irradiated to the other direction (see, e.g., JP 4-081337 A). Further, vehicle-purpose night vision systems have been proposed (see, e.g., JP 2006-188224 A). That is, in the vehicle-purpose night vision systems, for example, an object is detected, and then light of at least one pixel among a plurality of pixels within an optical attenuation matrix is attenuated in response to the detected result.

In general, a low beam distribution pattern is formed so as to attain a high luminous intensity around a cutoff line in order to enhance the distant visibility by the driver. In a case in which a technique to dim the area where a preceding vehicle is present is employed, light is irradiated on an area above the low beam distribution pattern more frequently. Thus, not only the light irradiated to an area of a low beam distribution pattern but also the light irradiated to an area above the low beam distribution pattern is requested to enhance the distant visibility by the driver.

SUMMARY OF INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Illustrative aspects of the present invention provide a vehicle headlamp apparatus which can enhance the distant visibility of the driver by way of light irradiated to an area above a low beam distribution pattern.

According to an illustrative aspect of the present invention, a vehicle headlamp apparatus is provided. The vehicle headlamp apparatus includes a low beam lamp unit which forms a low beam distribution pattern having a cutoff line along an upper edge thereof, and an additional lamp unit which forms an additional light distribution pattern including an area above the cutoff line of the low beam distribution pattern. The additional lamp unit is configured such that a luminous intensity of at least a portion of the additional light distribution pattern increases toward a horizontal line from above.

Other aspects and advantages of the invention will be apparent from the following description, the drawings and the claims.

DETAILED DESCRIPTION OF EXEMPLARY EMBODIMENTS OF INVENTION

Hereinafter, exemplary embodiments of the invention will be explained with reference to the drawings. The following exemplary embodiments are examples only and do not limit the scope of the invention.

Figure 1:
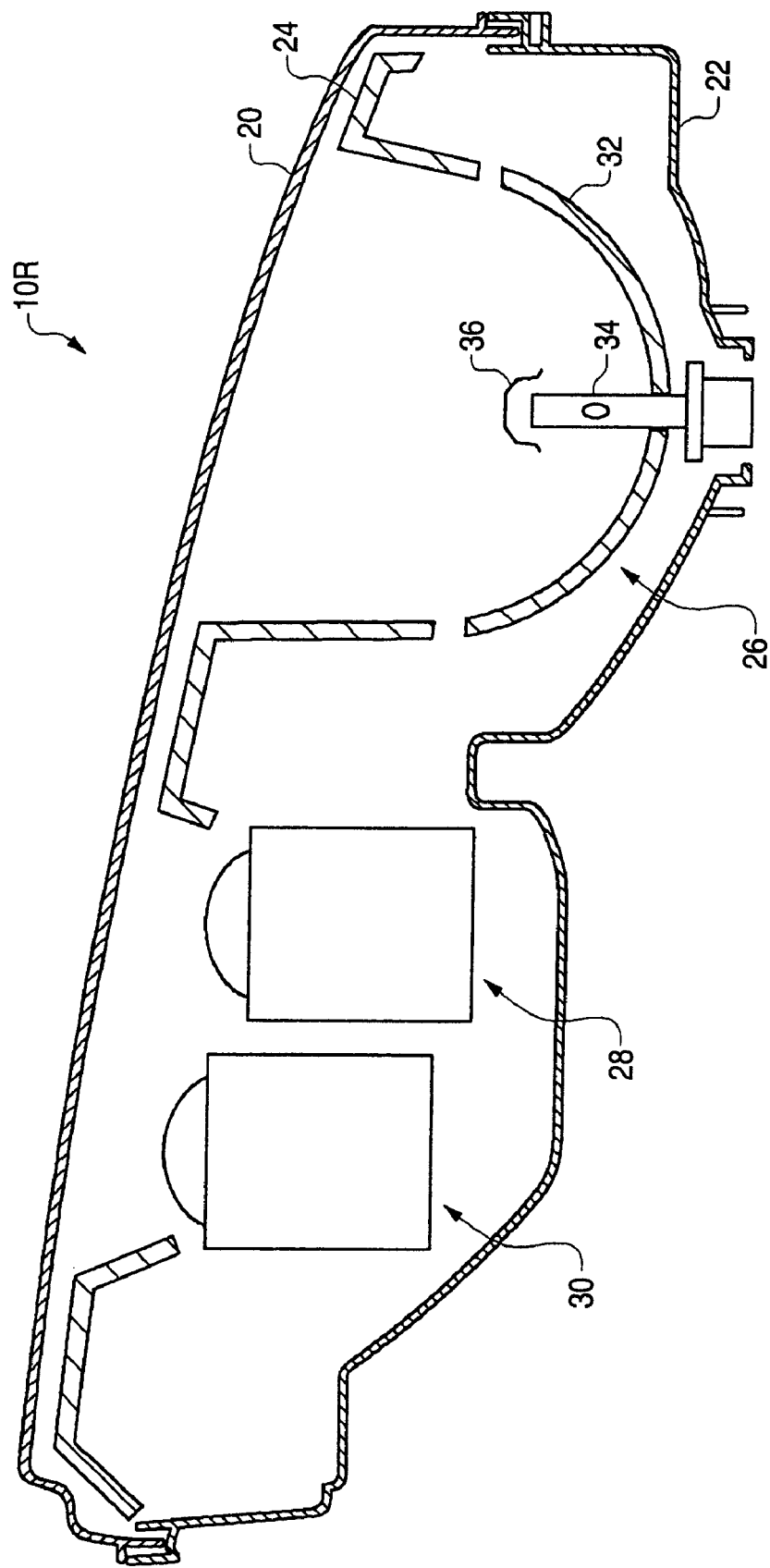
FIG. 1 is a sectional view of a right headlamp according to an exemplary embodiment of the present invention.

FIG. 1 is a sectional view of a right headlamp 10R of a headlamp apparatus according to an exemplary embodiment of the present invention, taken along a horizontal plane and view from above. The headlamp apparatus includes the right headlamp 10R and a left headlamp. Because the right headlamp 10R and the left headlamp are bilaterally symmetrical, only the right headlamp 10R will hereinafter be described in detail, and detailed description of the left headlamp will be omitted.

The right headlamp 10R includes a transparent cover 20, a lamp body 22, an extension 24, a first lamp unit 26, a second lamp unit 28, and a third lamp unit 30. The lamp body 22 is molded into a cup shape having an elongated opening with resin or the like. The transparent cover 20 is molded with transparent resin or the like and mounted on the lamp body 22 so as to cover the opening of the lamp body 22. The lamp body 22 and the transparent cover 20 form a lamp chamber, inside which the extension 24, the first lamp unit 26, the second lamp unit 28, and the third lamp unit 30 are arranged.

The extension 24 is fixed to the lamp body 22. The extension 24 is formed with openings through which light is irradiated from the first lamp unit 26, the second lamp unit 28 and the third lamp unit 30, respectively. With respect to a widthwise direction of the vehicle, the first lamp unit 26 is arranged on the outer side than the second lamp unit 28, and the second lamp unit 28 is arranged on the outer side than the third lamp unit 30. The first lamp unit 26 is a paraboloidal reflector type lamp unit and forms a low beam distribution pattern.

The first lamp unit 26 includes a reflector 32, a light source bulb 34, and a shade 36. The reflector 32 is formed into a cup shape and has an insertion hole in the center. In this exemplary embodiment, the light source bulb 34 is an incandescent lamp such as a halogen lamp having a filament. However, the light source bulb 34 may alternatively be a discharge lamp such as a metal halide bulb. The light source bulb 34 is inserted into the insertion hole of the reflector 32 so as to protrude inward and fixed to the reflector 32. The reflector 32 has a curved internal face formed to reflect light emitted form the light source bulb 34 toward the forward area of the vehicle. The shade 36 shields a light which is directly emanated from the light source bulb 34 in the forward direction.

Figure 2:
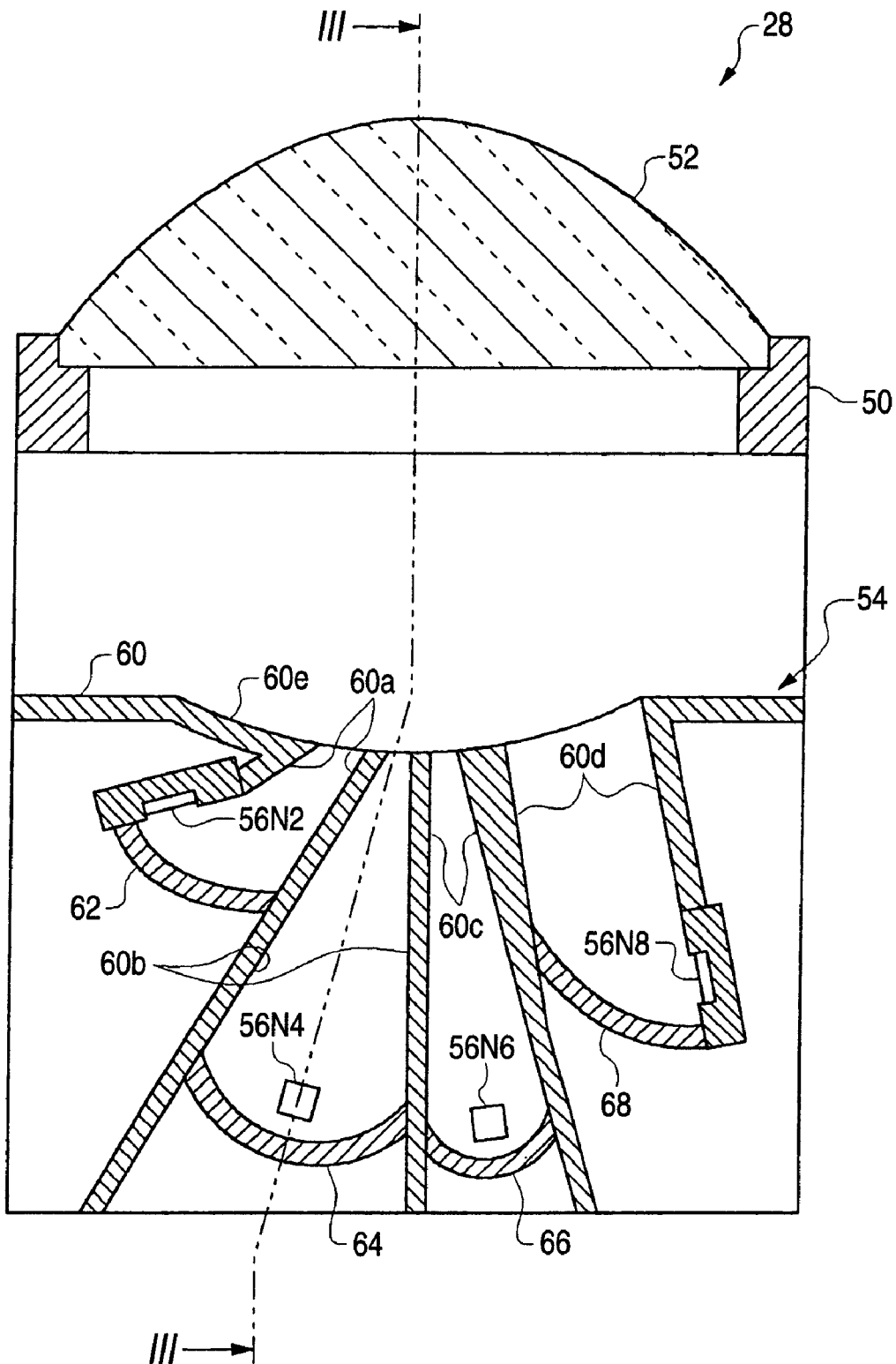
FIG. 2 is a sectional view of a second lamp unit of the right headlamp of FIG. 1.

FIG. 2 is a sectional view of the second lamp unit 28, taken along a horizontal plane and viewed from above. The second lamp unit 28 includes a holder 50, a projection lens 52, and a first light emitting unit 54.

The projection lens 52 is a plano-convex lens having a convex front surface and a flat rear surface. The projection lens 52 projects, as inverted images, light source images formed on its rear focal plane onto a virtual vertical screen in front of the lamp. The holder 50 includes an annular part to which the projection lens 52 is mounted.

The first light emitting unit 54 includes a second light emitting device 56N2, a fourth light emitting device 56N4, a sixth light emitting device 56N6, an eighth light emitting device 56N8, a first light guide member 60, and a first reflector 62, a second reflector 64, a third reflector 66 and a fourth reflectors 68. As will be described later, the third lamp unit 30 has a first light emitting device 56N1, a third light emitting device 56N3, a fifth light emitting device 56N5, and a seventh light emitting device 56N7. The first light emitting device 56N1, the second light emitting device 56N2, the third light emitting device 56N3, the fourth light emitting device 56N4, the fifth light emitting device 56N5, the sixth light emitting device 56N6, the seventh light emitting device 56N7 and the eighth light emitting device 56N8 will hereinafter be referred to as "light emitting devices 56" as a general term where appropriate. Each of the light emitting devices 56 includes a light emitting chip and a thin film. The light emitting chip may be a white light emitting diode having a light emitting surface of about one millimeter square. It should be noted that the light emitting chip is not limited to the white light emitting diode, and may be other types of surface-emitting devices such as a laser diode which emits light substantially in a point shape. The thin film is arranged to cover the light emitting surface of the light emitting chip.

The first light guide member 60 has a front surface 60e facing the projection lens 52. The front surface 60e is rearwardly concave in an arcuate shape so as to follow the locus of the rear focal points of the projection lens 52. The first light guide member 60 includes a first light guide path 60a, a second light guide path 60b, a third light guide path 60c and a fourth light guide path 60d. The light guide paths 60a to 60d are arranged side by side in the order of the first light guide path 60a to the fourth light guide path 60d from left to right. Each of the first to fourth light guide paths 60a to 60d has an opening at the front surface 60e. The first to third light guide paths 60a to 60c are formed such that a lateral width of each of the first to third light guide paths 60a to 60c is rearwardly widened from the respective opening at the front surface 60e. The fourth light guide path 60d is formed such that its lateral width is maintained nearly the same in the rearward direction from the opening at the front surface 60e. Rear openings of the first to fourth light guide paths 60a to 60d are blocked by the first to fourth reflectors 62 to 68, respectively. The opening at the front surface 60e will be simply referred to as the "opening".

The second light emitting device 56N2 is arranged on the left internal face of the first light guide path 60a. The fourth light emitting device 56N4 is arranged on the lower internal face of the second light guide path 60b. The sixth light emitting device 56N6 is arranged on the lower internal face of the third light guide path 60c.

The eighth light emitting device 56N8 is arranged on the right internal face of the fourth light guide path 60d.

Figure 3:
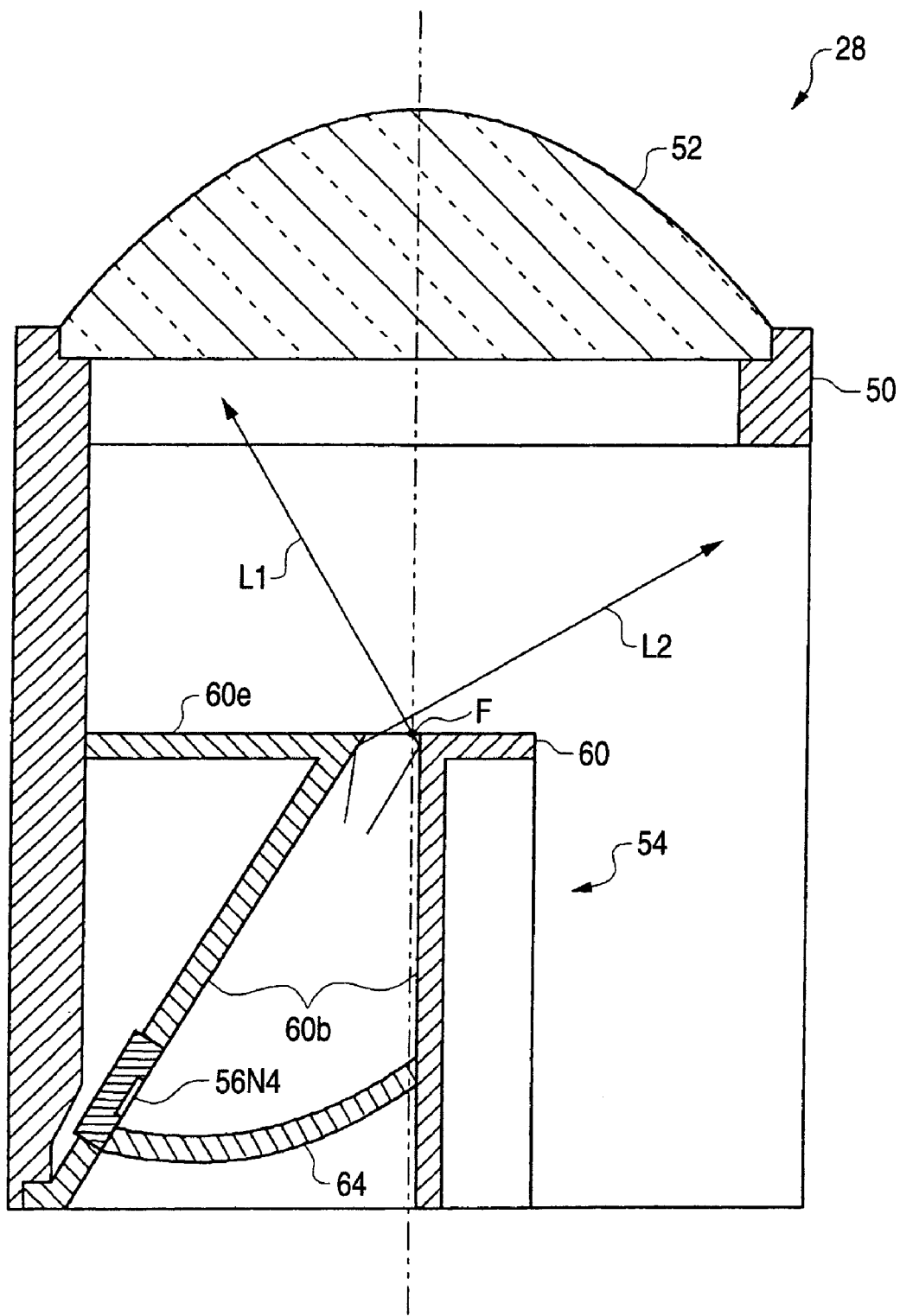
FIG. 3 is a sectional view taken along the line III-III of FIG. 2.

FIG. 3 is a sectional view taken along the line III-III of FIG. 2. The second reflector 64 includes a reflecting face on an inner side thereof. The reflecting face of the second reflector 64 is configured to reflect light from the fourth light emitting device 56N4 such that the luminous flux of the light passing through the opening of the second light guide path 60b increases toward the upper side of the lamp.

The first reflector 62 includes a reflecting face on a inner side thereof. The reflecting face of the first reflector 62 is configured to reflect light from the second light emitting device 56N2 such that the luminous flux of the light passing through the opening of the first light guide path 60a increases toward the upper side of the lamp. The third reflector 66 includes a reflecting face on an inner side thereof. The reflecting face of the third reflector 66 is configured to reflect light from the sixth light emitting device 56N6 such that the luminous flux of the light passing through the opening of the third light guide path 60c increases toward the upper side of the lamp. The fourth reflector 68 includes a reflecting face on an inner side thereof. The reflecting face of the fourth reflector 68 is configured to reflect light from the eighth light emitting device 56N8 such that the luminous flux of the light passing through the opening of the fourth light guide path 60d increases toward the upper side of the lamp. Accordingly, in each of the first to fourth light guide paths 60a to 60d, the luminous intensity of the light passing through the upper part of the opening becomes stronger than the luminous intensity of the light passing through the lower part of the opening. The first to fourth reflectors 62 to 68 may alternatively be configured to reflect the light from the corresponding light emitting device 56 such that the luminous flux of the light passing through the opening of each of the first to fourth light guide paths 60a to 60d becomes almost uniform.

The internal faces of the first to fourth light guide paths 60a to 60d are vapor-deposited with an aluminum material in order to enhance the light reflectivity. Thus, the internal faces of the first to fourth light guide paths 60a to 60d function as reflecting faces which reflect corresponding internal light. Alternatively, silver may be vapor-deposited instead of aluminum. By applying vapor deposition processing on the internal face of the light guide path to enhance the light reflectivity, it is possible to increase the luminous intensity of the light reflected on the internal face of the light guide path toward the projection lens 52.

The upper internal face of the second light guide path 60b is formed to extend, from the opening, parallel to the optical axis of the projection lens 52. Thus, as indicated by an arrow L1 for example, most of the light reflected by the upper internal face of the second light guide path 60b reaches the projection lens 52. The lower internal face of the second light guide path 60b is downwardly inclined from the opening. The lower surface is inclined at an angle to reach the upper part of the projection lens 52 when an extension line is drawn in forward direction. Therefore, as indicated by an arrow L2 for example, most of the light reflected by the lower internal face of the second light guide path 60b fails to reach the projection lens 52. In other words, the internal faces of the second light guide path 60b are formed such that the luminous intensity of the light reflected toward the projection lens 52 so as to form the lower part of the projected image is higher than the luminous intensity of the light reflected toward the projection lens 52 so as to form the upper part of the projected image. Accordingly, the luminous intensity of the projected image on the virtual vertical screen increases toward the lower part of the projected image.

Likewise, each of the first light guide path 60a, third light guide path 60c and fourth light guide path 60d is configured such that the upper internal face extends, from the opening, parallel to the optical axis of the projection lens 52 and such that the lower internal face downwardly inclines from the opening. The inclination angle of the lower internal face of each of the light guide paths 60a, 60c, 60d is the same as the inclination angle of the lower internal face of the second light guide path 60b.

Each of the first to fourth light guide paths 60a to 60d may be configured such that an angle formed by the upper internal face and the optical axis of the projection lens 52 may vary within a range of greater than $-\theta 1$ but smaller than $\theta 1$, wherein, assuming that the upward inclination from the optical axis of the projection lens 52 is the positive side, $-\theta 1$ is the angle formed by the lower internal face and the optical axis of the projection lens 52. For example, the upper internal face of each of the first to fourth light guide paths 60a to 60d may be upwardly inclined from the opening at an angle smaller than $\theta 1$, or may be downwardly inclined from the opening at an angle greater than $-\theta 1$. Also with such configurations, it is possible to make the luminous intensity of the light reflected toward the projection lens 52 so as to form the lower part of the projected image higher than the luminous intensity of the light reflected toward the projection lens 52 so as to form the upper part of the projected image.

Figure 4:
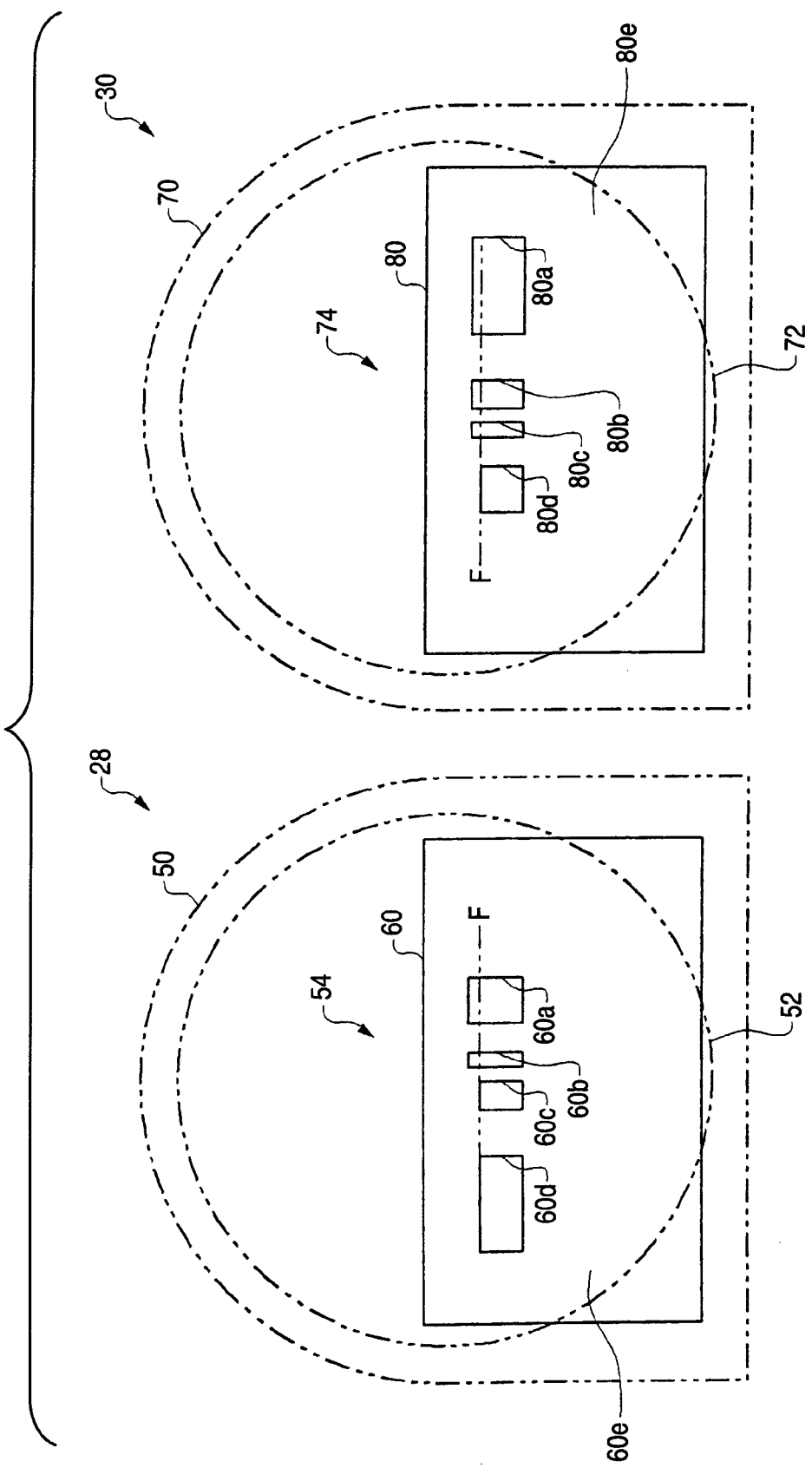
FIG. 4 is a front view of the second lamp unit and a third lamp unit of FIG. 1.

FIG. 4 is a front view of the second lamp unit 28 and the third lamp unit 30. As shown in FIG. 4, the openings of the first and second light guide paths 60a, 60b have the same height. Also, the openings of the third and fourth light guide paths 60c, 60d have the same height. Further, the heightwise dimension of the openings of the third and fourth light guide paths 60c, 60d is smaller than that of the openings of the first or second light guide path 60a, 60b. Each of the openings of the first to fourth light guide paths 60a to 60d defines a light source image which is projected on the virtual vertical screen. Thus, the first light guide member 60 functions as a light source image forming member.

The first light guide member 60 is arranged such that the locus of the rear focal point F of the projection lens 52 on the front surface 60e passes the upper portions of the openings of the first and second light guide paths 60a, 60b and a portion near or along the upper edge of the openings of the third and fourth light guide paths 60c, 60d. Thus, the first light guide member 60 is arranged such that, in a direction upward from a position below the horizontal line in a projected image projected on the virtual vertical screen by the projection lens 52, the light source image forming the corresponding portion and the focal point of the projection lens 52 will move away from each other. The light source image formed in a portion near the focal point of the projection lens 52 has high luminous intensity while the same image formed in a portion distant from the focal point of the projection lens 52 has low luminous intensity. By arranging the focal point of the projection lens 52 as in this exemplary embodiment, it is possible to form a projected image whose luminous intensity becomes higher toward the lower end.

The third lamp unit 30 includes a holder 70, a projection lens 72, and a second light emitting unit 74. The holder 70 and the projection lens 72 are the same as the holder 50 and the projection lens 52, respectively, of the second lamp unit 28. The second light emitting unit 74 includes a second light guide member 80 and four light emitting devices.

The front surface 80e of the second light guide member 80 is rearwardly concave in an arcuate shape so as to follow the locus of the rear focal points of the projection lens 52. The second light guide member 80 includes first to fourth light guide paths 80a to 80d arranged thereon. Each of the first to fourth light guide paths 80a to 80d has an opening in the front surface 80e formed so that its cross section along the horizontal plane will have line symmetry with the cross section of each of the first to third light guide paths 80a to 80d. The opening in the front surface 80e of the first to fourth light guide paths 80a to 80d will be simply referred to as the "opening".

Each of the first to fourth light guide paths 80a to 80d includes therein one light emitting device. In the following description, a light emitting device arranged in the first light guide path 80a is referred to as a first light emitting device 56N1, a light emitting device arranged in the second light guide path 80b is referred to as a third light emitting device 56N3, a light emitting device arranged in the third light guide path 80c is referred to as a fifth light emitting device 56N5, and a light emitting device arranged in the fourth light guide path 80d is referred to as a seventh light emitting device 56N7.

The rear opening in each of the first to fourth light guide paths 80a to 80d is blocked by a reflector (not shown), same as in the first light emitting unit 54. Each of theses reflectors reflects light from each light emitting device so that the luminous intensity of light passing through the opening will be greater approaching the upper part, same as the second lamp unit 28. Each of the first to fourth light guide paths 80a to 80d is formed so that the upper internal face will extend parallel to the optical axis of the projection lens 72 from the opening in the front surface 80e and that the lower internal face will be inclined downward from the opening in the front surface 80e, same as in the first light emitting unit 54.

Each of the first to third light guide paths 80a to 80c is formed so that the height of its opening will be identical. The fourth light guide path 80d is formed so that the height of its opening of the front surface 80e will be smaller than the height of the opening in the first to third light guide paths 80a to 80c. The opening in each of the first to fourth light guide paths 80a to 80d is used as a light source image which is projected on the virtual vertical screen. The second light guide member 80 thus functions as a light source image forming member.

The second light guide member 80 is arranged such that the locus of the rear focal point F of the projection lens 72 on the front surface 80e will pass near the upper edge of the opening in each of the first to third light guide paths 80a to 80c and above the opening in the fourth light guide path 80d. Thus, the second light guide member 80 is arranged such that, in a direction upward from a position below the horizontal line in a projected image projected on the virtual vertical screen by the projection lens 72, the focal point of the projection lens 72 will move away from the light source image forming the corresponding portion. This arrangement makes it possible to form a projected image whose luminous intensity becomes higher approaching the lower end.

Figure 5:
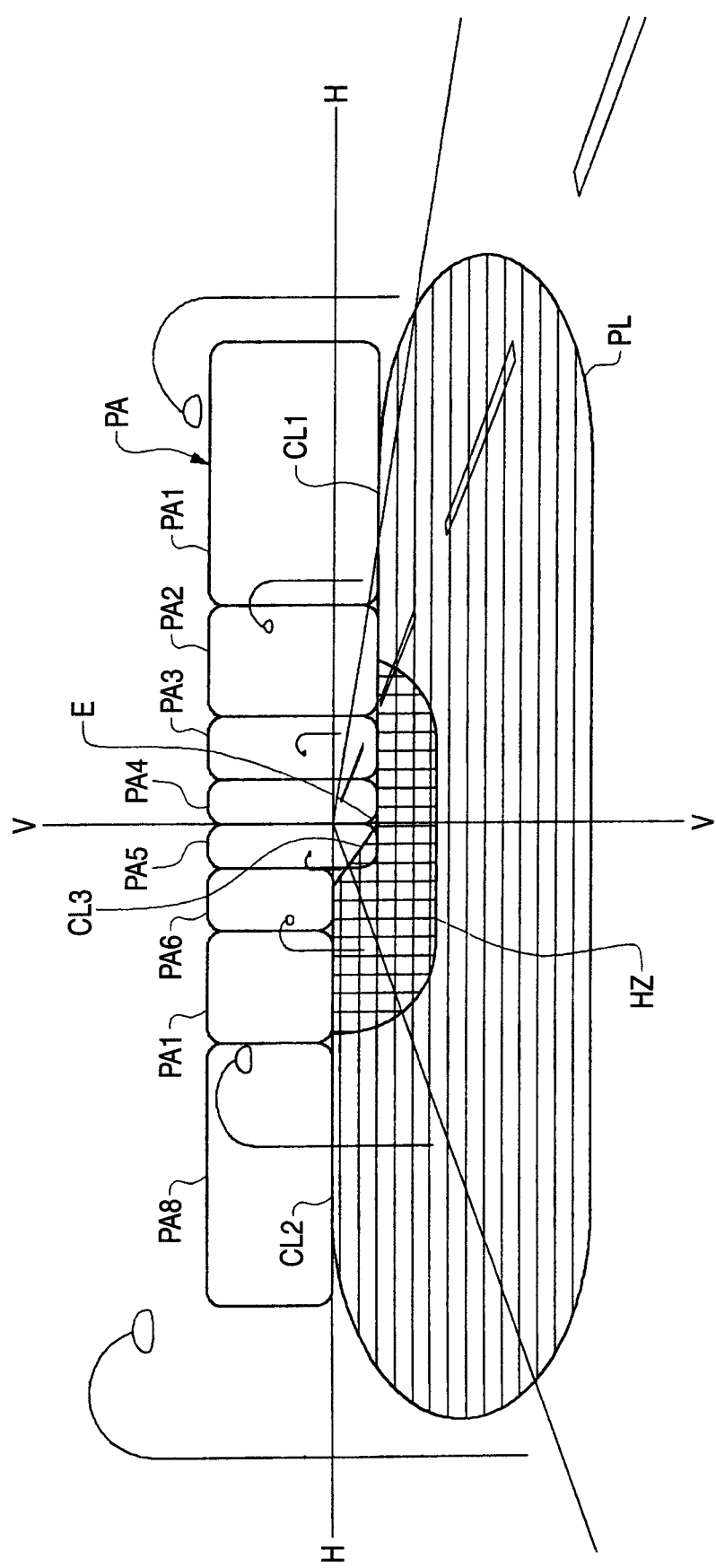
FIG. 5 illustrates a light distribution pattern formed, with light forwardly irradiated from right and left headlamps, on a virtual vertical screen arranged in front of a vehicle.

FIG. 5 illustrates a light distribution pattern formed, with light forwardly irradiated from the right headlamp 10R and the left headlamp, on the virtual vertical screen arranged, for example, at a position 25 meters in front of a vehicle.

A low beam distribution pattern PL is formed by a first lamp unit 26. The low beam distribution pattern PL illustrated in FIG. 5 is for a left-hand light traffic and includes first to third cutoff lines CL1 to CL3. The first to third cutoff lines CL1 to CL3 extend horizontally with a stepped difference between the right and left of the vertical line V-V passing through a vanishing point H-V in the forward direction of the lamp. The first cutoff line CL1 extends horizontally to the right of the line V-V and below the line H-H. Thus, the first cutoff line CL1 is used as an oncoming lane cutoff line. The third cutoff line CL3 extends diagonally at an inclination angle of 15 degrees in left-upward direction from the left end of the first cutoff line CL1. The second cutoff line CL2 extends on the line H-H to the left of the intersection of the third cutoff line CL3 and the line H-H. Thus, the second cutoff line CL2 is used as a lane cutoff line of the lane the vehicle is traveling in. In the low beam distribution pattern PL, an elbow point E at which the first cutoff line CL1 and the line V-V intersects is positioned below the line H-V by about 0.5 degrees to 0.6 degrees. A hot zone HZ is a high luminous intensity area and is formed to surround the elbow point E somewhat leftward.

The left headlamp also includes a second lamp unit 28 and a third lamp unit 30. An additional light distribution pattern PA is formed by irradiated light beams from the second lamp unit 28 and the third lamp unit 30 of the right headlamp 10R and irradiated light beams from the second lamp unit 28 and the third lamp unit 30 of the left headlamp overlaid one on the other. Each of the second lamp unit 28 and the third lamp unit 30 functions as an additional lamp unit for forming the additional light distribution pattern PA. The second lamp unit 28 and the third lamp unit 30 may function as high beam lamp units for forming a high beam distribution pattern.

The additional light distribution pattern PA is formed in the shape of a belt including the horizontal line and extending horizontally. The additional light distribution pattern PA has its upper end set in a position at an angle of about 5 degrees upward and includes a stepped part at the lower end so as to come into contact with the first cutoff line CL1 and the second cutoff line CL2. The left end and the right end are respectively set in positions at an angle of about 20 degrees leftward and rightward.

The additional light distribution pattern PA is divided into eight rectangular areas arranged in the horizontal direction. The eight rectangular areas will be hereinafter referred to as first to eighth partial regions PA1 to PA8 from right to left. The boundary between two adjacent partial regions is referred to as a division line. The division line between the fourth partial region PA4 and the fifth partial region PA5 is set to an angle of about 0 degrees. The division line between the third partial region PA3 and the fourth partial region PA4 is set to an angle of about 2 degrees rightward. The division line between the fifth partial region PA5 and the sixth partial region PA6 is set to an angle of about 2 degrees leftward. The division line between the second partial region PA2 and the third partial region PA3 is set to an angle of about 4 degrees rightward. The division line between the sixth partial region PA6 and the seventh partial region PA7 is set to an angle of about 4 degrees leftward. The division line between the first partial region PA1 and the second partial region PA2 is set to an angle of about 8 degrees rightward. The division line between the seventh partial region PA7 and the eighth partial region PA8 is set to an angle of about 8 degrees leftward. The position of the division lines described above is only an example, and the division lines may be positioned elsewhere than at the above described angles. The partial regions are also not limited to a rectangular shape but may have the shape of a trapezoid, a parallelogram or any other shape.

The first partial region PA1 is formed as a projected image of the opening in the first light guide path 80a as a light source image. Thus, the first partial region PA1 is formed with irradiated light from the first light emitting device 56N1 in each of the right headlamp 10R and the left headlamp.

The second partial region PA2 is formed as a projected image of the opening in the first light guide path 60a as a light source image. Thus, the second partial region PA2 is formed with irradiated light from the second light emitting device 56N2 in each of the right headlamp 10R and the left headlamp.

The third partial region PA3 is formed as a projected image of the opening in the second light guide path 80b as a light source image. Thus, the third partial region PA3 is formed with irradiated light from the third light emitting device 56N3 in each of the right headlamp 10R and the left headlamp.

The fourth partial region PA4 is formed as a projected image of the opening in the second light guide path 60b as a light source image. Thus, the fourth partial region PA4 is formed with irradiated light from the fourth light emitting device 56N4 in each of the right headlamp 10R and the left headlamp.

The fifth partial region PA5 is formed as a projected image of the opening in the third light guide path 80c as a light source image. Thus, the fifth partial region PA5 is formed with irradiated light from the fifth light emitting device 56N5 in each of the right headlamp 10R and the left headlamp.

The sixth partial region PA6 is formed as a projected image of the opening in the third light guide path 60c as a light source image. Thus, the sixth partial region PA6 is formed with irradiated light from the sixth light emitting device 56N6 in each of the right headlamp 10R and the left headlamp.

The seventh partial region PA7 is formed as a projected image of the opening in the fourth light guide path 80d as a light source image. Thus, the seventh partial region PA7 is formed with irradiated light from the seventh light emitting device 56N7 in each of the right headlamp 10R and the left headlamp.

The eighth partial region PA8 is formed as a projected image of the opening in the fourth light guide path 60d as a light source image. Thus, the eighth partial region PA8 is formed with irradiated light from the eighth light emitting device 56N8 in each of the right headlamp 10R and the left headlamp. In this way, each of the first to eighth light emitting devices 56N1 to 56N8 functions as an individual light source to form a corresponding one of the plurality of partial regions.

On a vehicle mounting the headlamp apparatus described above, a high beam switch and an intermediate switch are provided. When the intermediate switch is turned on, the intermediate beam mode is started. In the intermediate beam mode, the light emitting device 56 is turned off for forming a partial region where a preceding vehicle is present among the first to eighth partial regions PA1 to PA8 to suppress glare given to the driver of the preceding vehicle.

More specifically, a camera and a controller are further provided on the vehicle mounting the headlamp apparatus. The controller includes a central processing unit (CPU) for executing various calculating process operations, a read only memory (ROM) in which various control programs are stored in advance, a random access memory (RAM) which is utilized in order to store data and also used as a work area for executing relevant programs, and the like. The controller controls the light irradiation of the headlamp apparatus. The camera includes an imaging element, for example, a charge coupled device (CCD) sensor, or a complementary metal oxide semiconductor (CMOS) sensor. The camera captures an image of a forward region of the vehicle to produce image data. The camera is coupled to the controller to output the image data to the integrated controller.

When the intermediate beam switch is turned on, an intermediate beam on signal is outputted to the controller. The controller starts to control irradiated light from the headlamp by way of the intermediate beam mode. In the intermediate beam mode, the controller analyzes image data inputted from the camera and determines, for example, whether there is a preceding vehicle with headlamp turned on such as an oncoming vehicle. In a case in which there is such a preceding vehicle, the controller uses the position of the headlamp obtained from the analysis to identify the position of the oncoming vehicle. The controller uses the position of an identified preceding vehicle to determine whether the preceding vehicle is present in any one of the first to eighth partial regions PA1 to PA8. In a case in which the preceding vehicle is present in any one of the first to eighth partial regions, the controller turns off the light emitting device 56 for forming the partial region in which the preceding vehicle is present. Instead of turning off the light emitting device 56, the controller may alternatively control lighting of the light emitting device 56 so as to set the luminous intensity of the irradiated light forming the partial region determined to accommodate the preceding vehicle to a lower level than the level of the luminous intensity of a partial region in which the preceding vehicle is absent.

Figure 6:
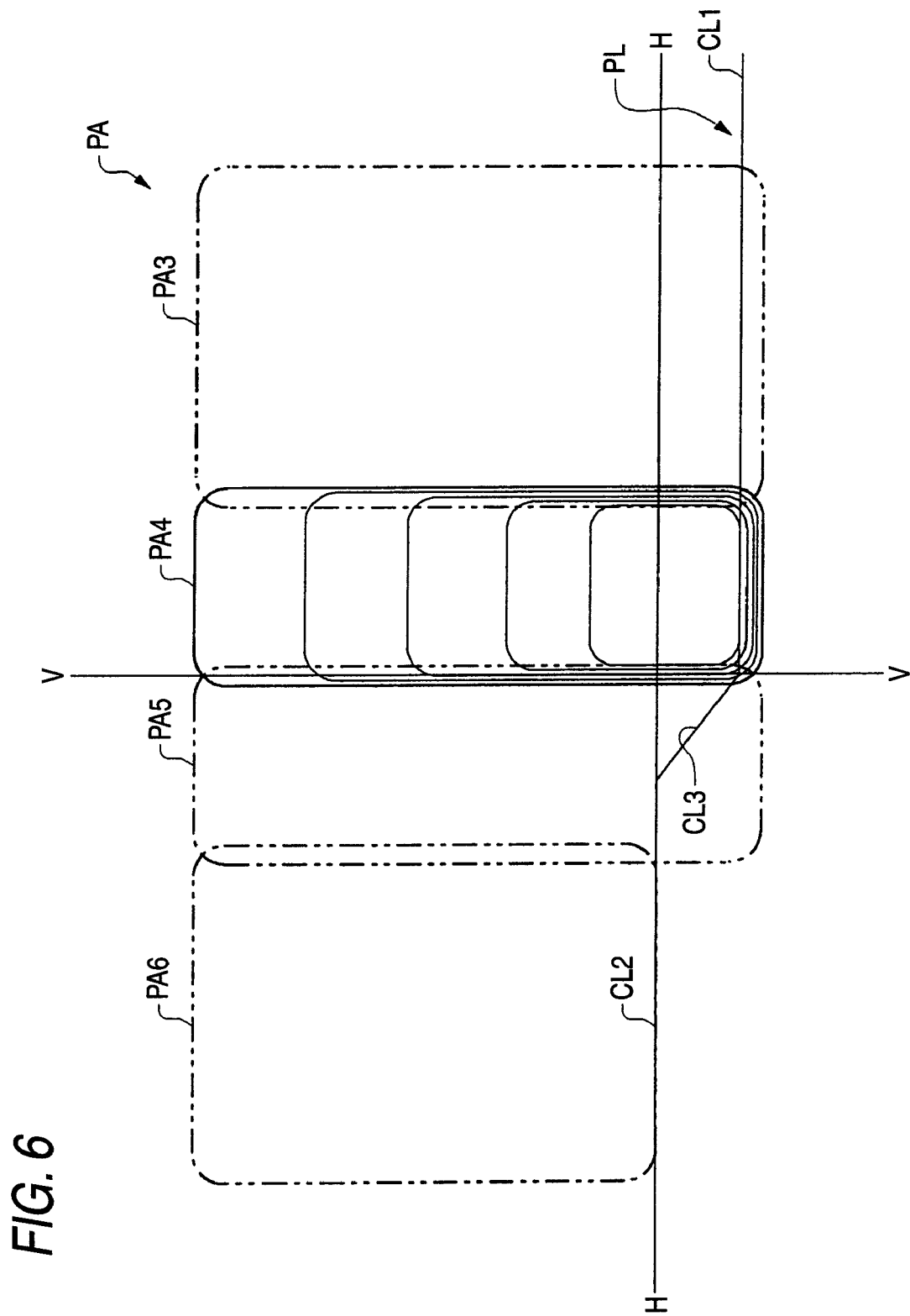
FIG. 6 illustrates a luminous intensity distribution of an additional light distribution pattern PA.

FIG. 6 illustrates the luminous intensity distribution of the additional light distribution pattern PA. In FIG. 6, the luminous intensity distribution of the fourth partial region PA4 is shown by contour lines as an example. As shown in FIG. 6, the first to eighth partial regions PA1 to PA8 are formed so that the sections around the left and right ends thereof will overlap one another. The first to eighth partial regions PA1 to PA8 are formed so that the sections around the lower ends thereof overlap one another near the cutoff line of the low beam distribution pattern PL.

As described above, at the upper part of the opening in the second light guide path 60*b* as a light source image of the fourth partial region PA4 is positioned the focal point of the projection lens 52. The second light guide path 60*b* is formed so that an upper internal face thereof will extend horizontally and a lower internal face thereof will be inclined downward from the opening. Thus, as shown in FIG. 6, the fourth partial region PA4 is formed so that the luminous intensity will be increased while approaching the Line H-H from above. Similarly, the first to third partial regions PA1 to PA3 and the fifth to eighth partial regions PA5 to PA8 are formed so that the luminous intensity will be increased while approaching the Line H-H from above. This arrangement improves the distant visibility by the driver obtained when the additional light distribution pattern PA is formed.

The fourth partial region PA4 is formed so that the luminous intensity will be increased while approaching the cutoff line of the low beam distribution pattern PL from above. The low beam distribution pattern PL is formed so that the luminous intensity around the cutoff line will be enhanced. On the other hand, the additional light distribution pattern PA overlaps the cutoff line of the low beam distribution pattern PL. In the case in which the additional light distribution pattern PA in the overlap area has low luminous intensity, the degree of contrast between the lower area and the upper area with respect to the cutoff line becomes larger. As a result, the driver perceives the light above the cutoff line as light of reduced luminous intensity, which could lead to a drop in the distant visibility by the driver.

In this exemplary embodiment, the right headlamp 10R and the left headlamp are arranged such that the luminous intensity will be increased while approaching the cutoff line from above in each of the partial regions. This arrangement reduces the degree of contrast between the lower area and the upper area with respect to the cutoff line thus suppressing a drop in the distant visibility by the driver.

Figure 7B:
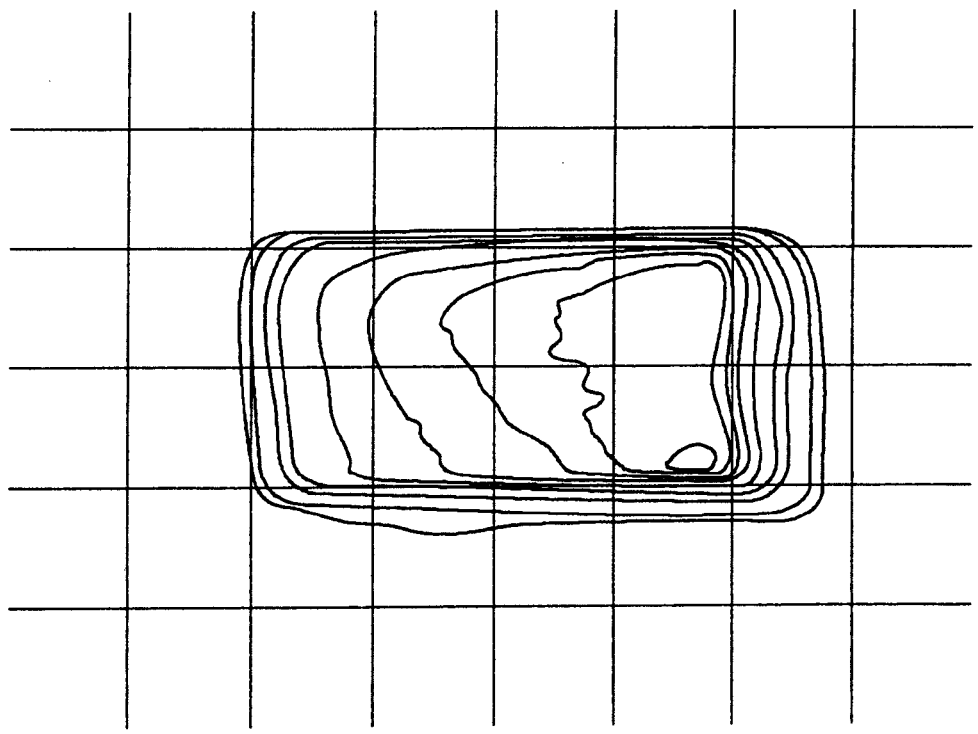
FIG. 7B illustrates a luminous intensity distribution in the partial regions in a case in which the vapor deposition processing is not applied to the light guide paths.
Figure 7A:
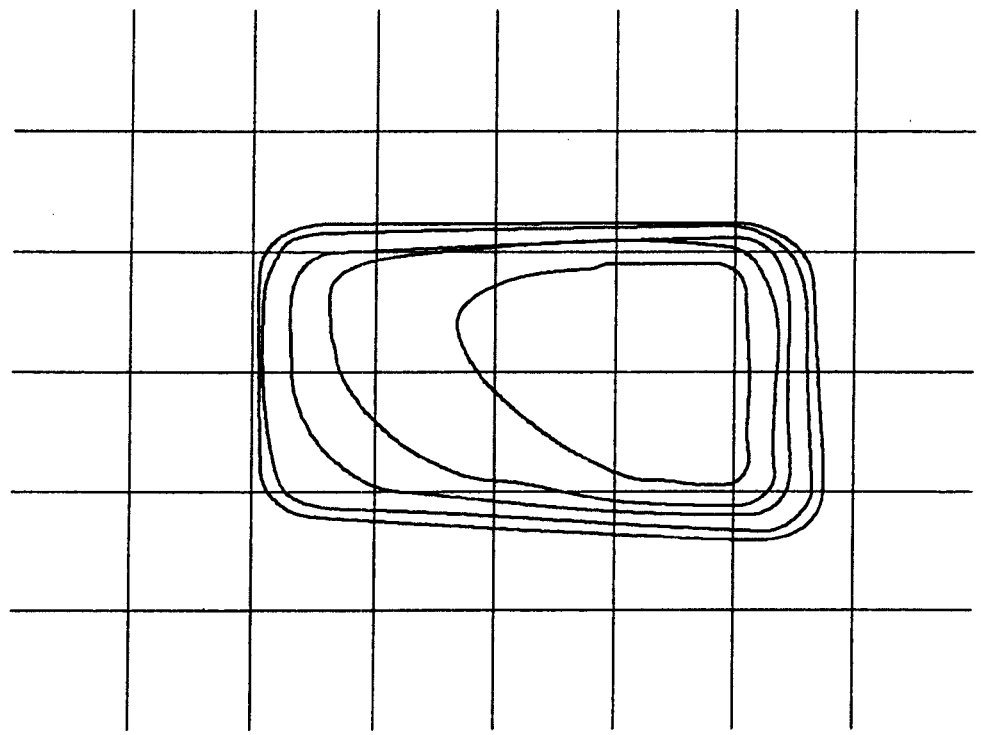
FIG. 7A illustrates a luminous intensity distribution in partial regions in a case in which a vapor deposition processing is applied to light guide paths.

FIG. 7A illustrates the luminous intensity distribution in a partial region in a case in which the vapor deposition processing is applied to the light guide path. FIG. 7B illustrates the luminous intensity distribution in a partial region in a case in which the vapor deposition processing is not applied to the light guide path. Compared with the luminous intensity distribution shown in FIG. 7B, luminous intensity becomes higher in the downward direction in the luminous intensity distribution shown in FIG. 7A. The inventors have found that, as a result of research and development, through vapor deposition on the light guide paths and by forming the light guide paths like the first to fourth light guide paths 60*a* to 60*d* or the first to fourth light guide paths 80*a* to 80*d*, the luminous intensity of light irradiated onto the lower part of a partial region becomes higher.

According to an illustrative aspect of the present invention, a vehicle headlamp apparatus is provided. The vehicle headlamp apparatus includes a low beam lamp unit which forms a low beam distribution pattern having a cutoff line along an upper edge thereof, and an additional lamp unit which forms an additional light distribution pattern including an area above the cutoff line of the low beam distribution pattern. The additional lamp unit is configured such that a luminous intensity of at least a portion of the additional light distribution pattern increases toward a horizontal line from above.

Accordingly, it is possible to illuminate the area around the horizontal line brightly even when light is irradiated onto the area ahead of a vehicle with the additional lamp unit. This brightness enhances the distant visibility by the driver thus increasing the vehicle safety in the nighttime driving.

The additional lamp unit may be configured such that the luminous intensity of said at least a portion of the additional light distribution pattern increases toward the cutoff line from above, wherein the cutoff line is below the horizontal line.

In general, a low beam distribution pattern is formed to enhance its luminous intensity near a cutoff line. When a low beam distribution pattern and an additional light distribution pattern are formed simultaneously, both light distribution patterns have high luminous intensity near a cutoff line. This pattern provides luminous intensity distribution with reduced variations near a cutoff line and suppresses the sense of congruity of the driver when a low beam distribution pattern and an additional light distribution pattern are formed simultaneously.

The additional lamp unit may include a light source, a light source image forming member which forms a light source image with a light emitted from the light source, and a projection lens through which the light source image projected to form the additional light distribution pattern. The light source image forming member may be configured to form the light source image such that, as a distance between a focal point of the projection lens and a portion of the light source image increases, a corresponding portion of the additional light distribution pattern that is formed by said portion of the light source image becomes higher from the horizontal line.

Accordingly, it is possible to form the additional light distribution pattern whose luminous intensity increases while advancing downward with a more simple arrangement of setting of a focus position.

The light source image forming member may include a reflecting face which reflects the light emitted from the light source toward the projection lens. The reflecting face may be configured such that the luminous intensity of the light reflected toward the projection lens so as to form a lower part of the additional light distribution pattern is higher than the luminous intensity of the light reflected toward the projection lens so as to form the upper part of the additional light distribution pattern. Accordingly, it is possible to form the additional light distribution pattern with higher luminous intensity in the lower part through a more simple arrangement of utilizing light reflected on the reflecting face.

The additional lamp unit may include a plurality of the light sources, and the at least a portion the additional light distribution pattern may include a plurality of partial regions, each of the light sources forming a corresponding one of the plurality of partial regions. At least one of the plurality of light sources may be configured to form the corresponding partial region such that the luminous intensity increases toward the horizontal line from above. Accordingly, it is possible to form an area in part of an additional light distribution pattern where the luminous intensity increases while approaching the horizontal line.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A vehicle headlamp apparatus comprising:
   a low beam lamp unit which forms a low beam distribution pattern having a cutoff line along an upper edge thereof; and
   an additional lamp unit which forms an additional light distribution pattern including an area above the cutoff line of the low beam distribution pattern,
   wherein the additional lamp unit is configured such that a luminous intensity of at least a portion of the additional light distribution pattern increases downward toward the cutoff line from above the cutoff line
   wherein the additional lamp unit comprises a light source; a light guide path including an upper reflective surface, a lower reflective surface, and an opening from which a light source image with a light emitted from the light source is emitted, and a projection lens through which the light source image is projected to form the additional light distribution pattern,
   the opening being formed between a front face of the upper reflective surface and a front face of the lower reflective surface; and
   the upper reflective surface and the lower reflective surface reflecting light from the light source.

2. The vehicle headlamp apparatus according to claim 1, wherein the light source image forming member is configured to form the light source image such that, as a distance between a focal point of the projection lens and a portion of the light source image increases, a corresponding portion of the additional light distribution pattern that is formed by said portion of the light source image becomes higher from the horizontal line.

3. The vehicle headlamp apparatus according to claim 1, wherein the light source image forming member comprises a reflecting face which reflects the light emitted from the light source toward the projection lens,
   wherein the reflecting face is configured such that a luminous intensity of the light reflected toward the projection lens so as to form a lower part of the additional light distribution pattern is higher than a luminous intensity of the light reflected toward the projection lens so as to form an upper part of the additional light distribution pattern.

4. The vehicle headlamp apparatus according to claim 1, wherein the additional lamp unit comprises a plurality of light sources, and said at least a portion of the additional light distribution pattern comprises a plurality of partial regions, wherein each of the plurality of light sources forms a corresponding one of the plurality of partial regions, and at least one of the plurality of light sources is configured to form the corresponding partial region such that the luminous intensity increases toward the horizontal line from above.

5. The vehicle headlamp apparatus according to claim 1, wherein the upper reflective surface is parallel to an optical axis of the projection lens and the lower reflective surface is downwardly inclined from the opening.

6. The vehicle headlamp apparatus according to claim 1, wherein a rear focal point of the projection lens is formed at the opening near or along the upper reflective surface.

7. The vehicle headlamp apparatus according to claim 5, wherein a rear focal point of the projection lens is formed at the opening near or along the upper reflective surface.

8. A method of forming a vehicle light distribution pattern, comprising:
   forming a low beam distribution pattern having a cutoff line along an upper edge thereof by a low beam lamp unit; and
   forming an additional light distribution pattern including an area above the cutoff line of the low beam distribution pattern by an additional lamp unit, a luminous intensity of at least a portion of the additional light distribution pattern increasing downward toward the cutoff line from above the cutoff line
   wherein the additional lamp unit comprises a light source, a light guide path including an upper reflective surface, a lower reflective surface, and an opening from which a light source image with a light emitted from the light source is emitted, and a projection lens through which the light source image is projected to form the additional light distribution pattern;
   the opening being formed between a front face of the upper reflective surface and a front face of the lower reflective surface; and
   the upper reflective surface and the lower reflective surface reflecting light from the light source.

9. The method according to claim 8, wherein the light source image forming member is configured to form the light source image such that, as a distance between a focal point of the projection lens and a portion of the light source image increases, a corresponding portion of the additional light distribution pattern that is formed by said portion of the light source image becomes higher from the horizontal line.

10. The method according to claim 8, wherein the light source image forming member comprises a reflecting face which reflects the light emitted from the light source toward the projection lens,
   wherein the reflecting face is configured such that a luminous intensity of the light reflected toward the projection lens so as to form a lower part of the additional light distribution pattern is higher than a luminous intensity of the light reflected toward the projection lens so as to form an upper part of the additional light distribution pattern.

11. The method according to claim 8, wherein the additional lamp unit comprises a plurality of light sources, and said at least a portion of the additional light distribution pattern comprises a plurality of partial regions, wherein each of the plurality of light sources forms a corresponding one of the plurality of partial regions, and at least one of the plurality of light sources is configured to form the corresponding partial region such that the luminous intensity increases toward the horizontal line from above.

12. The method according to claim 8, wherein the upper reflective surface is parallel to an optical axis of the projection lens and the lower reflective surface is downwardly inclined from the opening.

13. The method according to claim 8, wherein a rear focal point of the projection lens is formed at the opening near or along the upper reflective surface.

14. The method according to claim 12, wherein a rear focal point of the projection lens is formed at the opening near or along the upper reflective surface.

* * * * *